J. C. TUNNICLIFF.
CORN PLANTER.
APPLICATION FILED MAY 19, 1911.
1,000,462.
Patented Aug. 15, 1911.
2 SHEETS—SHEET 1.
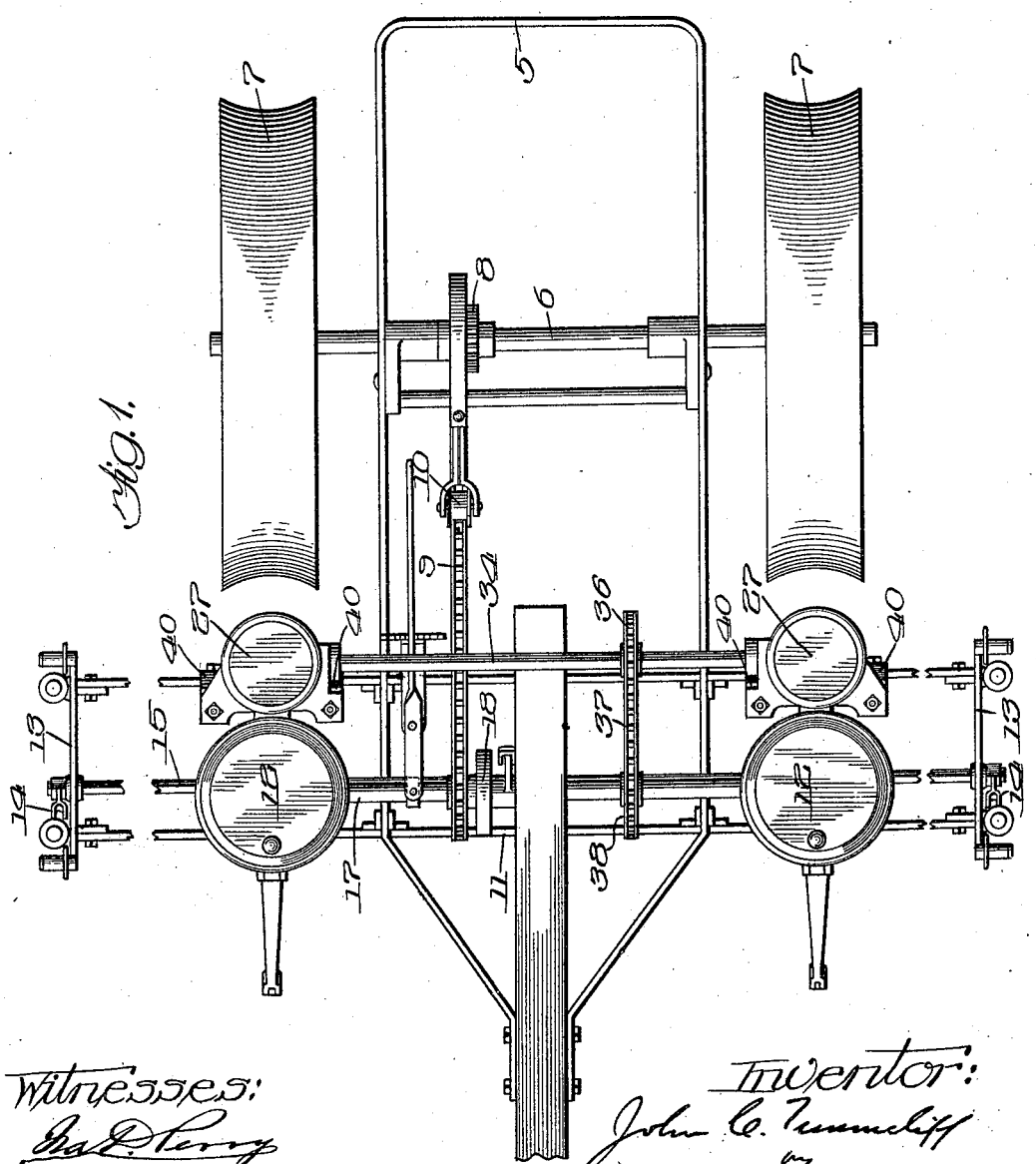

J. C. TUNNICLIFF.
CORN PLANTER.
APPLICATION FILED MAY 19, 1911.
1,000,462.
Patented Aug. 15, 1911.
2 SHEETS—SHEET 2.
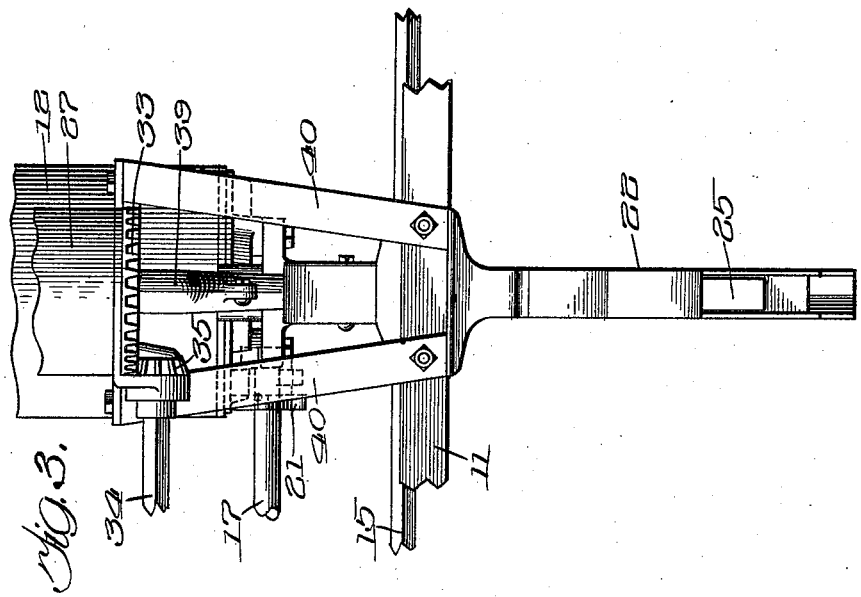
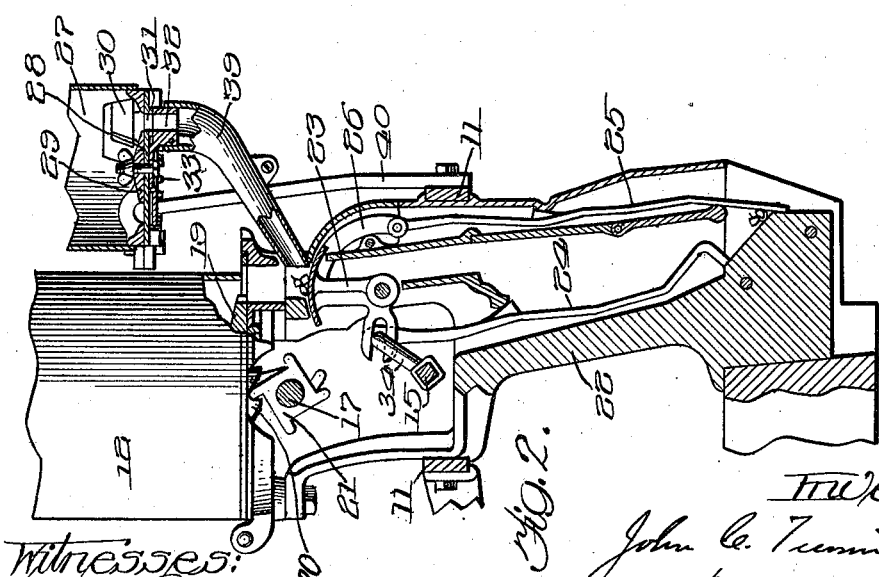

UNITED STATES PATENT OFFICE.

JOHN C. TUNNICLIFF, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

CORN-PLANTER.

1,000,462. Specification of Letters Patent. Patented Aug. 15, 1911.

Application filed May 19, 1911. Serial No. 628,181.

*To all whom it may concern:*

Be it known that I, JOHN C. TUNNICLIFF, a citizen of the United States, residing at Moline, in the county of Rock Island and State of Illinois, have invented certain new and useful Improvements in Corn-Planters, of which the following is a specification, reference being had to the accompanying drawings.

My invention relates to improvements in corn planters, and its object is to provide new and improved mechanism by which cow peas, or other similar leguminous product, may be dropped into the same hill with the corn.

It is well known that cow peas and some other leguminous products have the faculty of fertilizing the soil for reasons that are well known and well understood. Recently the idea has been developed among farmers and throughout agricultural stations that it is great benefit in certain soils to plant such a vegetable as cow peas with the corn. Indeed, it has been claimed that to do so actually causes an increase in the yield of corn the first year. At any rate, experience has shown that even if the yield of the first year's planting of corn is somewhat diminished the effect on the soil is such that the succeeding crops after the first year are gradually increased so as to more than offset this, and therefore such planting of peas with the corn is of great advantage. It has also been found that the best results are obtained when the corn and the cow peas are planted at the same time and in the same hills, because when this is done both crops can be harvested with the corn binder, and the peas used for ensilage or fed with corn fodder in the usual manner.

It is the object of my invention to provide a new and improved mechanism by which this may be accomplished and peas or similar leguminous vegetable may be planted in the same hills with the corn.

In the accompanying drawings,—Figure 1 is a top or plan view; Fig. 2 is an enlarged detail, being a side elevation of the seed-box and runner, mostly in vertical section; and Fig. 3 is an enlarged detail, being a rear view of the same parts shown in Fig. 2.

Referring to the drawings,—5 indicates the rear frame, in which is journaled an axle 6 on which are mounted carrying-wheels 7. The axle 6 is provided with the usual sprocket 8 carrying a sprocket-chain 9 with a sprocket-chain adjuster 10.

11 indicates the front or runner-frame, on which are mounted the usual seed-boxes 12 and check-rower heads 13 carrying the usual forks 14 adapted to be operated by a check-rower wire and serving, in the usual manner, to rock the check-rower shaft 15 which is suitably journaled in the machine. 17 indicates an operating-shaft journaled in the front frame 11 in the usual manner and carrying clutch mechanism 18. This clutch mechanism may be of any well-known description, as in itself it forms no part of my present invention and operates in the well-known manner. It is enough to say that the clutch mechanism consists of two members, one of which is secured to the operating-shaft 17 so as to rotate therewith, while the other is driven by the sprocket-chain 9. The clutch is operated by any well-known connection with the rock-shaft 15 in such a way that with each throw of the fork levers the clutch members are connected together so as to give the operating-shaft 17 a predetermined rotation and automatically disengage the clutch members at the end of that predetermined rotation.

19 (see Fig. 2) indicates a seed-plate, which is rotatably mounted in the bottom of the hoppers 12 and contains the usual seed-cups adapted to convey each a single grain of corn.

The seed-plate may be operated from the shaft by any suitable mechanism, but I prefer to use the mechanism shown and described in the patent to Emil E. Englund, No. 918,983, dated April 20, 1909, which is well known and needs no particular description here further than to say that 20 indicates a toothed gear ring, of the type shown in said Englund patent, rotatably mounted below the seed-boxes 12 and connected with the seed-plate 19 so as to rotate therewith. 21 indicates a toothed member slidingly mounted on the operating-shaft 17 and adapted to engage the toothed ring 20 and by sliding it in one direction or the other on the shaft to vary the number of seeds deposited in the hill in the manner shown and described in said Englund patent. 22 indicates the runner-shank, which is provided with any well-known dropping mechanism operated by the check-rower rock-shaft 15. The form which I prefer to use is that shown in detail in Fig. 2, in which there is an upper valve 23 operated by an arm 24 on the rock-shaft 15 so as to receive and accumulate the corn dropped upon the seed-plate. 24 indicates a second valve, which is operated by the rock-shaft 15 and operates to push out the corn when dropped into the heel of the shank by the operation of the valve 23. 25 indicates a vertically-movable valve operated by a connection 26 with the upper valve 23 so as to close the heel of the runner while the grain is dropped into it and open the same in time to be pushed out by the push-valve 24. These parts will be readily understood and, forming no part of my present invention, will need no further description.

27 indicates hoppers adapted to contain cow peas or similar leguminous seed.

28 indicates seed-plates mounted in the bottoms of the hoppers 27 and provided with a cover-cap 29, cut-off 30 and with suitable seed-cells 31 adapted to feed the cow peas from the hopper 27 through a discharge spout 32 in the bottom thereof when the seed-plate is rotated.

33 indicates annular gears rotatably mounted in the bottom of the seed-boxes 27 and connected in any suitable manner with the seed-plate 28 so as to rotate the same when the gear ring is rotated.

34 indicates a shaft, which is suitably journaled in the front frame and is preferably squared, except, of course, at the points at which it is journaled.

35 indicates gears mounted upon the end of the shaft 34 and meshing with annular gears 33.

36 indicates a sprocket, which is slidingly mounted on the squared shaft 34 and is connected by means of a sprocket-chain 37 with a sprocket 38 fixed on the operating-shaft 17. The object of having the shaft 34 squared and the sprocket 36 slidingly mounted upon it is to enable the sprocket-wheel 36 to automatically aline with the sprocket 38.

39 indicates discharge-tubes connected to the bottom of the hoppers 27. The lower end opens into the runner-shank, which is above the valve 23 and the upper end surrounds the discharge-tube 32 so that when the seed-plate 28 is rotated the cow peas in the hoppers 27 will be discharged through the spout 39 and mingle with the corn as it accumulates from the seed-plates 19 upon the upper valve 23 and may be dropped with the corn when the check-rower mechanism operates as above described. The seed hoppers 27 are supported in any usual way, as by brackets 40 connected with the front frame.

It will be obvious that by the above construction the seed-plates in the hoppers 27 are rotated at the same time as the corn seed-plates in the hoppers 12—that is, during the period of the clutch engagement—and the peas will be accumulated with the corn in such number as may be desired and dropped with the corn into the hill. It will also be obvious that by the above construction the number of peas dropped will not in any way be affected by the variable drop of the corn, as the means for varying the rotation of the seed-plate 19 are independent of the means by which the seed-plates in the hoppers 27 are driven by the rotation of the operating-shaft.

That which I claim as my invention, and desire to secure by Letters Patent, is,—

1. In combination, in a corn-planter, a seed-box, a seed-plate in said seed-box, an operating-shaft, means for driving said seed-plate from said operating-shaft, an auxiliary seed-box, a rotatable seed-plate therein, a second operating-shaft, means for driving said second operating-shaft from said first operating-shaft, and a discharge spout leading from said auxiliary seed-box adapted to mingle the grain discharged therefrom with the grain discharged from the first seed-box.

2. In combination, in a corn-planter, a runner-frame, a wheel-frame, seed-boxes mounted on said runner-frame seed-plates in said seed-boxes, an operating-shaft, and means for driving said operating-shaft from the wheel axle of said wheel-frame, auxiliary seed-boxes mounted on said runner-frame, seed-plates therein, an operating-shaft for driving said seed-plates, means for driving said second operating-shaft from said first operating-shaft, and discharge tubes leading from said auxiliary seed-boxes into the runner shank below the first-named seed-boxes and adapted to mingle the seed discharged from said auxiliary seed-boxes with the seed discharged from the main seed-boxes.

3. In a corn-planter, in combination, a wheel-frame having a shaft journaled therein and wheels on said shaft, a runner-frame, an operating-shaft mounted on said runner-frame, means for driving said operating-shaft from said wheel axle, said means including clutch mechanism, check-rower mechanism on said runner-frame adapted to control said clutch mechanism, runner valves operated by said check-rower mechanism, seed-plates in said seed-boxes, means for driving said seed-plates from said operating-shaft, auxiliary seed-boxes mounted on said runner-frame and having seed-spouts leading therefrom into the runner shanks above said runner valves, seed-plates in said seed-boxes connected with said second operating-shaft, and means for driving said second operating-shaft from said first operating-shaft.

JOHN C. TUNNICLIFF.

Witnesses:
 ALMA J. OLSON,
 CHAS. M. McCUTCHEN.

Copies of this patent may be obtained for five cents each, by addressing the "Commissioner of Patents. Washington, D. C."